Patented Dec. 20, 1938

2,140,824

UNITED STATES PATENT OFFICE 2,140,824

HYDROXY-ALKYL ETHERS OF PHENYL PHENOLS

Clarence C. Vernon, Louisville, Ky., assignor to University of Louisville, Louisville, Ky., a corporation of Kentucky No Drawing. Application February 20, 1937, Serial No. 126,807

8 Claims. (Cl. 260—613)

The invention relates to hydroxy-alkyl ethers of phenyl phenols. These are new compounds which have been found useful as plasticizers for alkyl cellulose products and other cellulose derivatives, as fixatives for perfumes, and for other purposes.

The new compounds are colorless crystalline solids or viscous liquids. They may be prepared by reacting a phenyl phenol with an alkylene chlorhydrin in the presence of an alkali. For example, the phenyl phenol may be dissolved in an excess of aqueous caustic alkali, the solution heated to a moderate temperature and the alkylene chlorhydrin gradually added with stirring. After the chlorhydrin has been added, heating under reflux may be continued for a period of time to complete the reaction, after which the reaction mixture is diluted with water to precipitate the product. The latter is filtered, washed, and recrystallized from an organic solvent. If the product does not crystallize readily, it may be purified by distillation under reduced pressure. The compounds may also be formed by reacting a phenyl phenol with an alkylene oxide.

*Example 1.—Hydroxy-ethyl ether of ortho-phenyl phenol*

A mixture of 1 mol of ortho-phenyl phenol and 1.8 mols of potassium hydroxide in 1000 parts of water is heated to boiling in an apparatus provided with a reflux condenser. While maintaining the temperature and stirring, 1.5 mols of ethylene chlorhydrin in 30 per cent aqueous solution is gradually added over a period of about 1 hour. The product is precipitated by adding 2000 parts of cold water, and the precipitate separated by filtration. The brownish colored crystal mass so obtained is purified by recrystallizing from toluene or ethyl alcohol to yield white crystals of the beta-hydroxy-ethyl ether of ortho-phenyl phenol, having the formula:

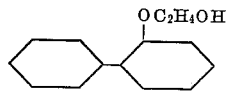

*Example 2.—Hydroxy-ethyl ether of para-phenyl phenol*

A mixture composed of 1 mol of para-phenyl phenol and 1.3 mols potassium hydroxide in 2000 parts of water is heated to boiling under reflux, and 1.3 mols of a 40 per cent aqueous solution of ethylene chlorhydrin is slowly added over a period of about 2 hours, with constant stirring, after which stirring and refluxing are continued for 1 hour longer. A quantity of 2000 parts of hot water is then added to precipitate the product, and the mixture is filtered hot to separate the precipitate. The product, after washing with hot water, is recrystallized from ethyl ether, being obtained as small white crystals, having the formula

*Example 3.—Hydroxy-ethyl ether of meta-phenyl phenol*

A mixture of 1 mol of meta-phenyl phenol and 1.3 mols of potassium hydroxide in 2000 parts of water is heated to about 95° C., whereupon 1.3 mols of pure ethylene chlorhydrin is slowly added with stirring over a period of about 30 minutes. Stirring and heating are continued for 30 minutes to 1 hour, the temperature being raised to about 110° C. After stirring is stopped the mixture separates while still hot into two liquid layers. The upper oily layer is separated from the lower aqueous layer, washed with water and dried. It is purified by distillation under reduced pressure. The purified product, having a boiling point of 186° C. at 4 mm. absolute pressure, is a viscous colorless liquid, the formula being:

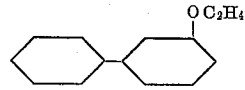

In similar manner other hydroxy-alkyl ethers of phenyl phenols may be prepared by reacting a phenyl phenol with the appropriate alkylene chlorhydrin. Properties of some of the compounds of the invention are shown in the following table.

| Compound | M. P. °C. | B. P. °C. |
|---|---|---|
| Hydroxy-ethyl ether of ortho-phenyl phenol | 77° | 164°–167°/3 mm. |
| Hydroxy-ethyl ether of para-phenyl phenol | 122°–123° | 200°–205°/6–7 mm. |
| Hydroxy-ethyl ether of meta-phenyl phenol | Viscous liquid | 186°/4 mm. |
| Hydroxy-propyl ether of ortho-phenyl phenol | 60°–60.5° | 183°–187°/6–7 mm. |
| Hydroxy-propyl ether of meta-phenyl phenol | Viscous liquid | 168°–169°/3–4 mm. |
| Hydroxy-butyl ether of meta-phenyl phenol | Viscous liquid | 165°–167°/3 mm. |

The hydroxy-alkyl ethers of phenyl phenols constituting the subject matter of this invention are characterized by the following structural formula;

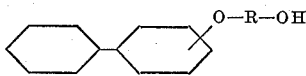

in which R represents an alkylene radical, e. g., ethylene ($C_2H_4$), propylene ($C_3H_6$), butylene ($C_4H_8$), etc.

I claim:

1. A hydroxy-alkyl ether of a phenyl phenol having the formula:

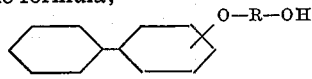

in which R represents a lower alkylene radical.

2. A hydroxy-alkyl ether of a phenyl phenol having the formula

in which R represents an alkylene radical containing not more than 4 carbon atoms.

3. A hydroxy-alkyl ether of ortho-phenyl phenol having the formula;

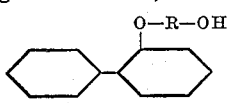

in which R represents an alkylene radical containing not more than 4 carbon atoms.

4. A hydroxy-alkyl ether of meta-phenyl phenol having the formula;

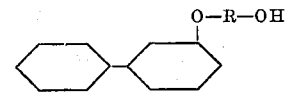

in which R represents an alkylene radical containing not more than 4 carbon atoms.

5. A hydroxy-alkyl ether of para-phenyl phenol having the formula;

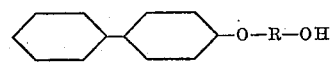

in which R represents an alkylene radical containing not more than 4 carbon atoms.

6. Hydroxy-ethyl ether of ortho-phenyl phenol.
7. Hydroxy-ethyl ether of meta-phenyl phenol.
8. Hydroxy-ethyl ether of para-phenyl phenol.

CLARENCE C. VERNON.